United States Patent
Vukich et al.

(10) Patent No.: US 11,334,856 B2
(45) Date of Patent: May 17, 2022

(54) CHECK TAMPERING PREVENTION USING BLOCKCHAIN

(71) Applicant: Capital One Services, LLC, McLean, VA (US)

(72) Inventors: Adam Vukich, Alexandria, VA (US); Colin Hart, Arlington, VA (US); Jason Ji, Reston, VA (US); Kaitlin Newman, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 26 days.

(21) Appl. No.: 16/198,680

(22) Filed: Nov. 21, 2018

(65) Prior Publication Data

US 2020/0160286 A1  May 21, 2020

(51) Int. Cl.
  *G06Q 20/04* (2012.01)
  *G06Q 20/38* (2012.01)
  *G06N 20/00* (2019.01)

(52) U.S. Cl.
  CPC .......... *G06Q 20/042* (2013.01); *G06N 20/00* (2019.01); *G06Q 20/389* (2013.01); *G06Q 20/3827* (2013.01); *G06Q 2220/00* (2013.01)

(58) Field of Classification Search
  CPC ............ G06Q 20/042; G06Q 20/3827; G06Q 20/389; G06Q 2220/00; G06N 20/00
  USPC .......................................................... 705/64
  See application file for complete search history.

(56) References Cited

U.S. PATENT DOCUMENTS

| | | | |
|---|---|---|---|
| 5,748,737 A * | 5/1998 | Daggar | G06K 7/0021 235/379 |
| 7,965,894 B2 | 6/2011 | Tian et al. | |
| 9,633,062 B1 | 4/2017 | Vollmer | |
| 9,855,785 B1 * | 1/2018 | Nagelberg | G06K 7/10722 |
| 10,423,938 B1 * | 9/2019 | Gaeta | G06Q 20/4016 |
| 11,005,666 B2 * | 5/2021 | Uhr | H04L 63/1483 |
| 2007/0033137 A1 * | 2/2007 | Provost | G06Q 10/10 705/40 |
| 2017/0214699 A1 * | 7/2017 | Johnsrud | H04L 9/3239 |
| 2017/0300978 A1 * | 10/2017 | Narasimhan | G06Q 20/3829 |
| 2017/0309108 A1 * | 10/2017 | Sadovsky | G07D 7/206 |
| 2017/0329996 A1 | 11/2017 | Wilson | |
| 2017/0344988 A1 * | 11/2017 | Cusden | G06F 21/00 |
| 2018/0225660 A1 * | 8/2018 | Chapman | G06Q 20/3827 |
| 2019/0095922 A1 * | 3/2019 | Watson | G06Q 20/3827 |
| 2019/0155513 A1 * | 5/2019 | Maeda | G06F 16/2322 |
| 2019/0166101 A1 * | 5/2019 | Ramos | H04L 9/0827 |

(Continued)

OTHER PUBLICATIONS

Ron White, How Computers Work, Oct. 15, 2003, Paul Boger, Illustrated by Timothy Edward Downs, 7th Edition (Year: 2003).*

Primary Examiner — Mohammad A. Nilforoush
Assistant Examiner — Wodajo Getachew
(74) Attorney, Agent, or Firm — Kacvinsky Daisak Bluni PLLC

(57) ABSTRACT

Various embodiments are directed to techniques for ensuring that a negotiable instrument has not been altered between the time the instrument leaves the hands of the payor and when the check is presented for redemption by the payee by recording an image of the check in a data block in a blockchain and retrieving the image when the check is presented for redemption for comparison with the check. A match between the stored image and the check indicates that no alteration of the check has occurred.

18 Claims, 10 Drawing Sheets

(56) References Cited

U.S. PATENT DOCUMENTS

2019/0188806 A1\* 6/2019 Torrenegra ............. G06Q 50/01
2019/0340584 A1\* 11/2019 Arora ................... G06K 7/1417
2020/0372184 A1\* 11/2020 Meirosu ................ H04L 9/3239

\* cited by examiner

500

```
Receive check image and metadata and place in record
502
           │
           ▼
Calculate hash vale from metadata and place hash value in record
504
           │
           ▼
Cache record in blockchain cache until conditions for
addition to blockchain are met.
506
           │
           ▼
Publish one or more records to member systems for inclusion in blockchain
508
           │
           ▼
Receive confirmation that data block containing one or more records was
added to the blockchain and return status to individual payors.
510
```

Receive check image and metadata of check to be verified
702

Calculate the hash value using the received metadata
704

Use the calculated hash value to retrieve a record from the blockchain using the hash value as an index
706

Extract the image and metadata from the retrieved block
708

Compare the extracted image and metadata with the received image and metadata and reported the results
710

*FIG. 7*

CHECK TAMPERING PREVENTION USING BLOCKCHAIN

BACKGROUND

Although the banking industry is moving more and more to computerized transactions, the use of physical negotiable instruments to transfer value is still a very important part of the banking industry. A negotiable instrument, for example, a check, is a signed document that transfers a sum of money from a payor to a payee. Either party is typically a person or business. The check is drawn on the account of the payor and comprises a document bearing the name of the payee, the account number of the payor on which the check is drawn, a date, an endorsement authorizing the payment and the amount of the payment. A physical check may be redeemed by the payee, by presenting the check to a bank which facilitates the transfer of the sum from the account of the payor to the account of the payee, by depositing the check to an ATM, by depositing the check through a mobile banking application, or by assigning the check to a secondary payee. Although a check is the most common form of negotiable instrument, other forms of negotiable instruments may include, for example, cashier's checks, money orders or traveler's checks. Negotiable instrument may also include, for example, promissory notes or other contracts promising the payment of money.

Checks may be handwritten or drafted and signed via machine. Once a check has been drafted, signed and is out of the payor's hands, it can be taken by someone that is not the intended recipient and/or altered in some manner, constituting check fraud. Most commonly, check fraud involves the alteration of the amount of the check to reflect a value higher than the payor intended. This could involve serious consequences for the payor when the check is redeemed, resulting in a higher than expected amount of money being removed from the payor's account, which may cause the payor's account to become overdrawn. Additionally, it may not be possible to reverse the fraud, leading to the payor permanently losing the funds. Although handwritten checks may be easier to alter in this manner, it is also possible to alter checks which have been drafted via a machine.

Currently, most solutions to this problem revolve around physical security measures for controlling access to the check, for example, tracking the check during delivery of the check by mail. In such cases, access to the physical check may be limited by some means only to interested parties. However, this still leaves open the possibility of fraud perpetrated by the actual intended recipient of the check. Therefore, would be to be desirable to provide a way to guarantee that a check has not been altered between the time the check leaves the hands of the payor until the check is presented for redemption at a bank.

BRIEF DESCRIPTION OF THE DRAWINGS

FIG. 5 is a flowchart showing a process for recording the image of the check in the blockchain FIG. 7 is a flowchart showing a process for retrieving an image from the blockchain and comparing it to a check presented for redemption.

DETAILED DESCRIPTION

Figure 1A:
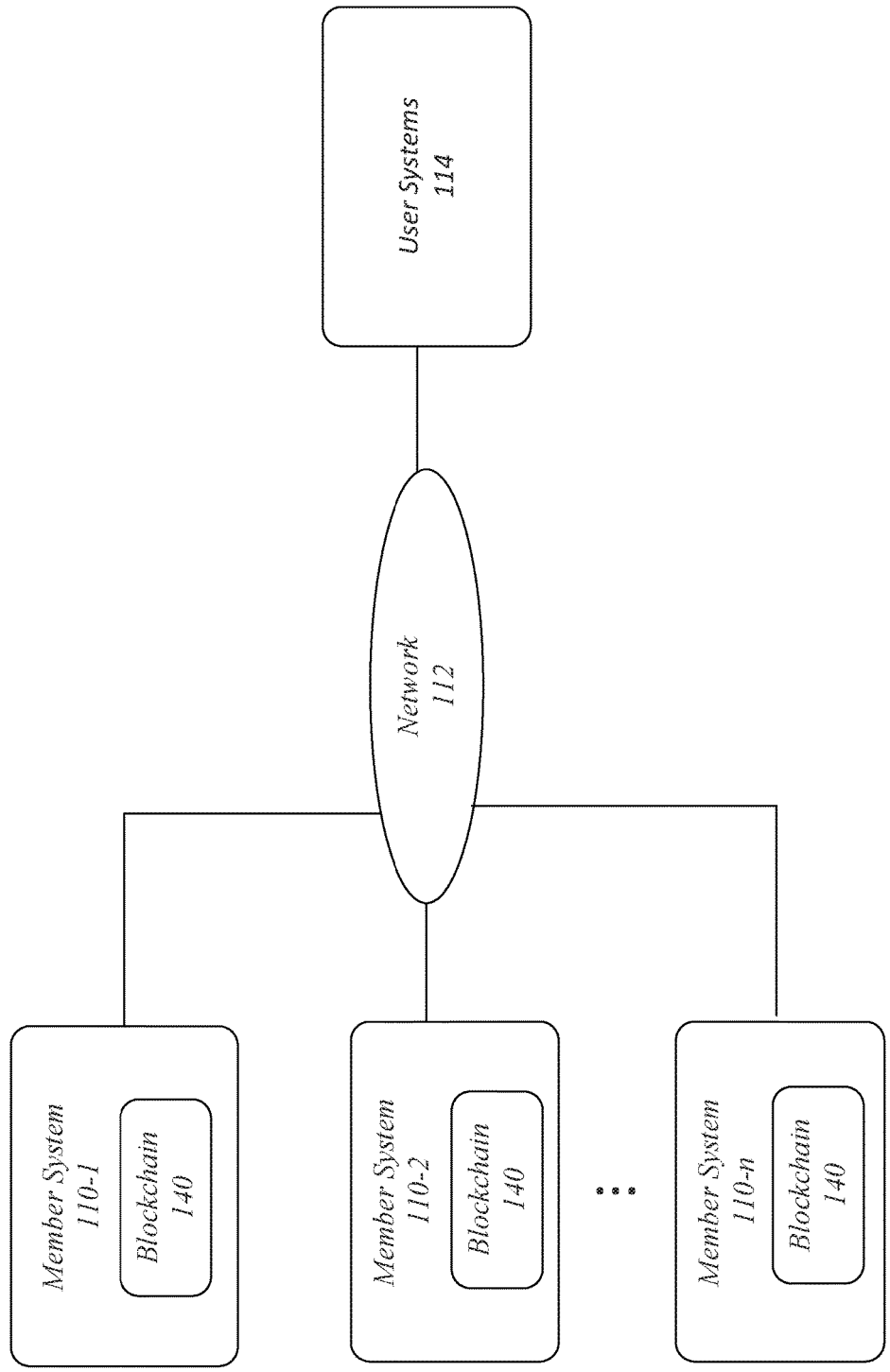
FIG. 1A is a logical diagram showing a high level overview of the check tampering prevention system.

Various embodiments are directed to techniques for ensuring that a negotiable instrument has not been altered between the time the instrument leaves the hands of the payor and when the check is presented for redemption by the payee. In one embodiment of the invention, a public, private or consortium blockchain is established between participating financial institutions. An image of the negotiable instrument, along with specific metadata, is entered into a record in a data block included in the blockchain. When the check is presented for cashing, the image of the check is retrieved and compared with the physical specimen of the check or an image of this physical specimen of the check to determine a match therebetween, indicating that the check has not been altered.

In some embodiments, an image of the check may be digitized by the payor using a software tool, for example, an app running on a smartphone or user device or via a facility offered on the website of the financial institution. Metadata associated with the image of the check may be entered by hand, determined using machine-learning trained natural language processing models or handwriting recognition models and delivered to a financial institution participating in the blockchain. A server at the financial institution may communicate with the user device to receive the image and associated metadata. The digitized image and the metadata are then recorded as all or a portion of the payload in a data block which becomes a link in the blockchain.

In some embodiments, the metadata provided or determined to be associated with the check may be used to create a cryptographic hash which may later be used to index the record of the image of the check within the blockchain.

In some embodiments, the financial institution receiving the image of the check and the associated metadata may consolidate several checks received from different payors and include each image and associated metadata in a record as part of the data payload of a data block within the blockchain.

In some embodiments, a bank receiving physical check for cashing may query the blockchain to retrieve an image of the check. Metadata available from information on the check, for example, one or more of the account number, the date, the amount of the check and the name of the payee may be cryptographically hashed to obtain an index which may be used to identify the image of the check the blockchain.

In some embodiments, the metadata may be entered by hand or may be determined by machine learning models trained to retrieve the metadata from an image of the check. Once the image of the check has been retrieved from the blockchain, it may be compared with the physical specimen of the check or an image of the physical specimen of the check. The comparison may be performed manually by a human, for example, a bank clerk or the payee, or the check may be scanned, and the comparison may be performed by a machine learning model trained to compare images of checks.

These and other embodiments are explained in more detail below.

As used herein, the terms "bank" and "financial institution" are used interchangeably and are intended to include all institutions which engage in the business of reconciling or facilitating the movement of checks through the financial system, including, for example, credit unions.

The system is explained herein using the example of a check; however, as used herein, the term "check" is intended to include all types of negotiable instruments.

In the figures and the accompanying description, the designation "n" is intended to be a variable representing any positive integer. Thus, for example, if an implementation sets a value for n=5, then a complete set of components 50, illustrated in the specification and drawings as 50-1 . . . 50-n may include components 50-1, 50-2, 50-3, 50-4 and 50-5. When an object depicted in the drawings as being one of n, for example, 50-1, and then referred to in the text as reference number 50, without the enumerated portion of the reference number, the reference to the object should be interpreted as being any one of objects 50-1 . . . 50-n. The embodiments are not limited in this context.

FIG. 1A depicts a schematic of an exemplary blockchain implementation of check tampering prevention system 100, consistent with disclosed embodiments. The blockchain implementation may comprise systems with access to blockchain 140 over a network 112.

The blockchain implementation can generate a non-reputable record of interactions using the blockchain 140. Furthermore, the blockchain 140 can be distributed, encouraging trust in the validity of the records stored in the blockchain 140. In this manner, the described embodiments provide an innovative technical solution to at least the above-mentioned technical problems with conventional systems.

Member systems 110-1 . . . 110-n comprise the embodiment of blockchain 140, with each member system 110 having a local copy of the most recent version of blockchain 140. Member systems 110 may be one of several nodes in blockchain 140 responsible for completing data blocks and adding the completed data blocks to the blockchain 140, as described below. Member systems 110 may comprise one or more computing devices, such as a server, a server farm, a workstation, a desktop computer, or a special-purpose computing device. Member systems 110 may be standalone or may be part of a subsystem, which may be part of a larger system. For example, member systems 110 may be associated with a financial institution. Member systems 110 may include distributed servers that are remotely located and communicate with other systems of the financial institution over a public network, or over a dedicated private network.

User systems 114 may use the facilities of the distributed blockchain 140, without being members of the blockchain 140. As such, user systems 114 do not act as a node in the blockchain network, that is, user systems 114 will not participate in the completion of blocks in blockchain 140. In some embodiments user systems 114 may have a local copy of the distributed blockchain 140 for read-only access, while in other embodiments, user systems 114 may not have a local copy of the distributed blockchain 140 but must rely on member systems 110 to access data stored in blockchain 140. In some embodiments, user systems 114 may pay a fee in exchange for the ability to use blockchain 140. User systems 114 may comprise one or more computing devices, such as a server, a server farm, a workstation, a desktop or a special-purpose computing device. User systems 114 may be associated with a financial institution. User systems 1140 may include distributed servers that are remotely located and communicate with other systems of the financial institution over a public network, or over a dedicated private network.

Blockchain 140 may comprise a distributed data structure, consistent with disclosed embodiments. Blockchain 140 may be a configured as a public, private or consortium blockchain, or a combination thereof. For example, member systems 110 may store local copies of blockchain 140. The member systems 110 may be configured to add blocks to blockchain 140, complete the data blocks and publish the data blocks to other member systems 110. Member systems 110 may be configured to receive records containing images of checks and their associated metadata from user systems 114 for publication in blockchain 140. The user systems 114 may have read-only access to blockchain 140.

Network 112 may be configured to provide communications between the components of FIG. 1A. For example, network 112 may be any type of network (including infrastructure) that provides communications, exchanges information, and/or facilitates the exchange of information, such as the Internet, a Local Area Network, or other suitable connection(s) that enables authentication system 100 to send and receive information between the components of check tampering prevention system 100.

Figure 1B:
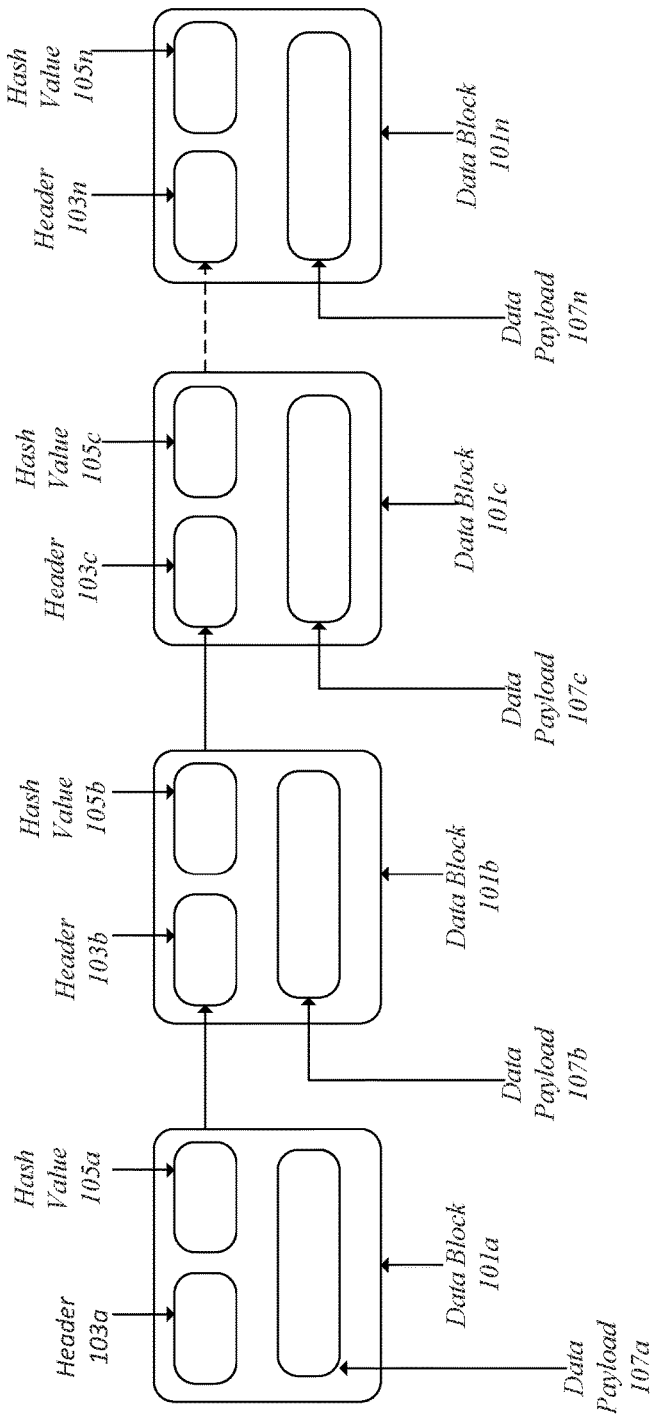
FIG. 1B is a logical model of a blockchain used in accordance with the claimed embodiments.

FIG. 1B depicts a logical model of an exemplary blockchain 140, consistent with disclosed embodiments. Blockchain 140 consists essentially of a series of data blocks 101a . . . 101n linked together in a manner described below. Data blocks 101 consists of a header 103, a data payload 107 and the hash value 105. The hash value 105n of each data block 101n is included in the header 103n+1 of the next data block 101n+1 in the blockchain 140, thereby creating the chain.

Member systems 110 may be configured to store data payloads 107 in data blocks 101 in blockchain 140, consistent with disclosed embodiments. In some aspects of the invention, member systems 110 may be configured to create new data blocks 101 for addition to blockchain 140, the data blocks 101 containing a data payload 107, the data payload 107 comprising one or more records containing one or more images of checks and the metadata related to the checks. In various aspects, member systems 110 may be configured to accept records for storage in blockchain 140 from user systems 114.

As described in detail with respect to FIG. 1B, blockchain 140 may be configured to store data payloads 107 from member systems 110, the data payloads 107 including one or more records, as described below. Blockchain 140 may be distributed and comprise many copies of blockchain 140 maintained by different systems or nodes, for example, member systems 110 may each have a local copy of the most recent version of blockchain 140. Such exemplary blockchains may comprise blocks, such as data blocks 101a . . . 101n. A data block 101n may include data payloads, such as data payload 107n, each data payload containing one or more records. Generally, data blocks 101 include a header, such as headers 103a . . . 103n, which uniquely identifies each block. The headers 103 may include a hash value generated by a hash function. For example, a header 103*n* may include at least the hash value of the previous block 103*n*−1 and may also include one or more of a hash value generated based on any data payload 107 in the data block 101, (e.g., a Merkle root), and a timestamp.

Consistent with disclosed embodiments, to be added to blockchain 140 each data block 101, must be completed by calculating a hash value 105 for that data block 101. In some embodiments, a hash value 105 may be a simple hash of the data block 101. In other embodiments hash value 105 may be the result of the satisfaction of a proof-of-work condition. Headers 103 may include a nonce chosen to ensure that the hash value 105 satisfies a proof-of-work condition. As a non-limiting example, the proof-of-work condition may require that a nonce be chosen for inclusion in data block 101 which causes the hash value 105 for data block 101 to fall within a predetermined range of values.

Additionally, the header 103 may be digitally signed with a cryptographic key of a member system 110, and the digital signature may be included in the header 103. This digital signature may be verified using a key available to the member systems 110. In certain embodiments, header 103 may include a digital fingerprint of recognized handwriting on a handwritten check.

Blockchain 140 may comprise one or a combination of several different types of blockchain. In one embodiment, blockchain 140 may comprise, for example, a consortium blockchain in which all participants in the blockchain 140 are member systems 110, and wherein a proof-of-stake function determines which member system 110 will complete each data block 101, that is, which member system 110 will calculate the hash value 105 for data block 101. The proof-of-stake function may be any function that assigns the duty of completing a particular data block to a particular member system 110 based upon some stake held in the success of blockchain 140. As a nonlimiting example, proof-of-stake may be based upon the number of records inserted by a member system 110 in the blockchain 140, by the length of membership of member system 110 in the blockchain 140, or by any other means. Member systems 110 having larger stakes in the blockchain 140 may have the opportunity to complete data blocks more frequently than member systems 110 having a lesser stake in the blockchain 140. In the case where in blockchain 140 is a consortium blockchain containing only member systems 110, the hash value 105 for each data block 101 may be a simple hash of the block.

In another embodiment, blockchain 140 may comprise a private blockchain, which may be a consortium blockchain in which only member systems 110 may complete blocks but which may also include user systems 114 which may publish records for inclusion in blocks and which may read the blockchain. The private blockchain may allow only member systems 110 to have copies of the blockchain 140 or may allow both member systems 110 and user systems 114 to have copies of the blockchain 140, but only allow member systems 110 to complete blocks for inclusion in blockchain 140.

In yet another embodiment, blockchain 140 may comprise a public blockchain in which any node may participate in the blockchain 140 and complete blocks in the blockchain 140. In such cases, it may be desirable that data payloads 107, or individual records in data payloads 107 be encrypted before being included in the data payload 107 of a data block 101. In one embodiment, the public blockchain will require that a proof-of-work condition be satisfied to complete each data block 101 in blockchain 140. In such cases, a node completing a block may be given a reward. The reward may be, for example, a financial reward generated by fees collected from user systems 114 for storing records in the blockchain 140. In such cases, the difficulty of the proof-of-work condition may be adjusted to obtain a desired average time to calculate the correct nonce which generates the hash value for the block that satisfies the proof-of-work condition.

Cryptographic keys may be used to encrypt elements of data payloads 107 in data blocks 101, consistent with disclosed embodiments. In some aspects of the invention, such cryptographic keys may be associated with member systems 110. Corresponding cryptographic keys may be available to decrypt the encrypted data payloads, consistent with disclosed embodiments. For example, when a data payload in a block is encrypted with a symmetric key, the same symmetric key may be available for decrypting the encrypted element. As another example, when a data payload of a message in a block is encrypted with a private key, a corresponding public key may be available for decrypting the encrypted element. In some aspects of the invention, the corresponding cryptographic keys may be available to member systems 110.

Figure 2A:
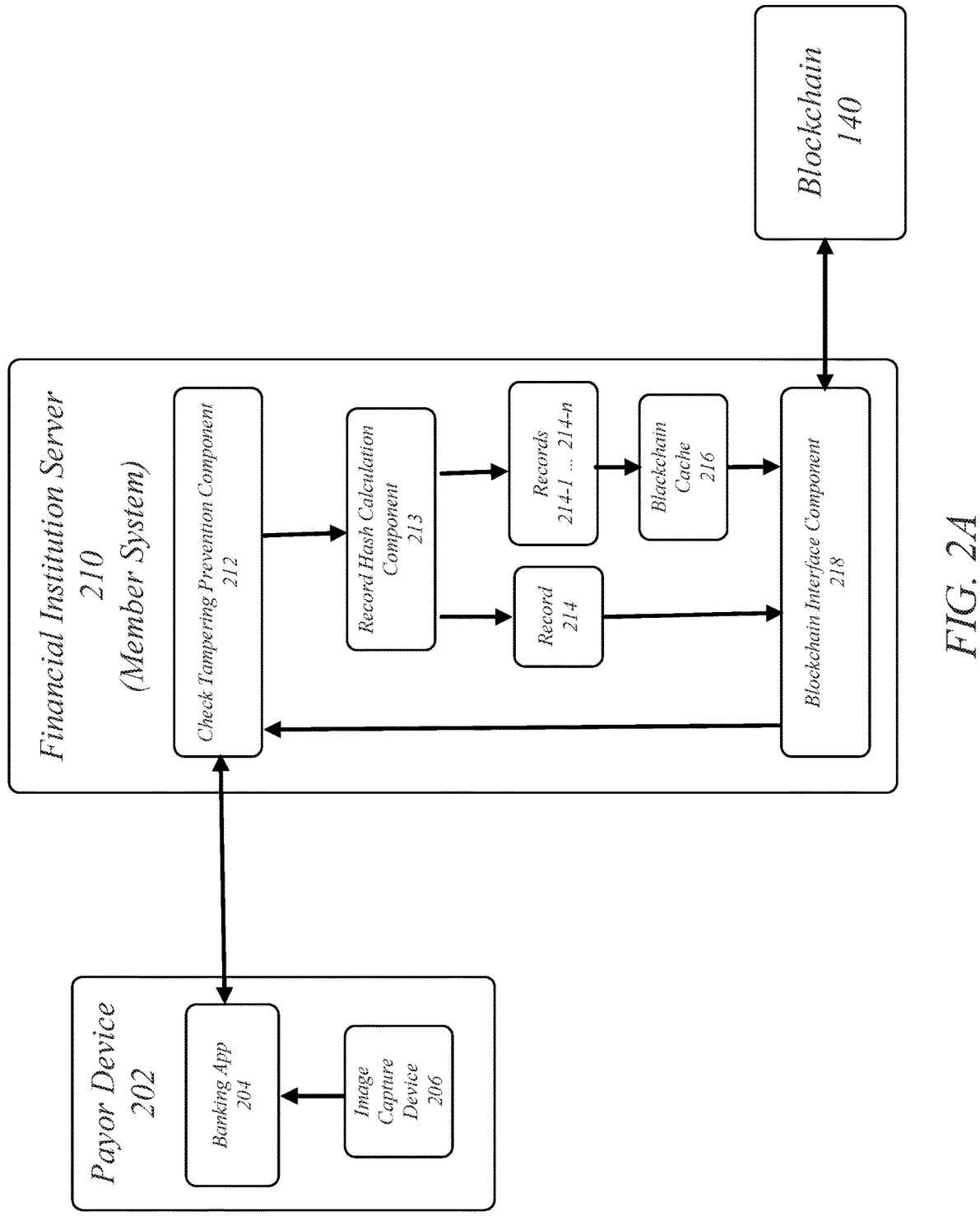
FIG. 2A as a logical diagram showing the portion of the check tampering prevention system for interacting with a payor to include an image of a check within the blockchain.

FIG. 2A illustrates a block diagram for a payor interacting with check tampering prevention system 100 to have an image of a check stored in the block chain. Although FIG. 2A shows a limited number of elements in a certain topology, it may be appreciated that more or fewer elements may be included in alternate topologies as desired for a given implementation.

In certain embodiments, financial institution server 210 may be configured as a member system 110, consistent with disclosed embodiments, as described above. In other embodiments, financial institution server 210 may be configured as a user system 114, consistent with disclosed embodiments, as described above.

A payor first creates a check by either handwriting the check or by having the check created by machine, for example, a personal computer configured with financial software capable of printing a check on a printer, or a business or government which mass produces machine-written checks. The check will typically include at least the name of the payee, the account number on which the check is drawn, the date, the amount of the check, and the endorsement of the payor in the form of the signature or other indicia. Additional information may also be included on the check, for example, the name of the financial institution holding the account upon which the check is drawn, a check number, etc. The check may be printed in its entirety by machine or may be printed or handwritten on a pre-printed form typically having at least the account number on which the check is to be drawn and the check number pre-printed thereon, with spaces for the payor to fill in the payee's name, the amount of the check, the date and to provide an endorsement.

Once the physical check has been prepared, the payor may use the payor device 202 to interface with the financial institution server 210. In various embodiments, the payor device 202 may comprise, for example, and without limitation, a client device, a personal digital assistant, a mobile computing device, a smartphone, a cellular telephone, a handset, a messaging device, a computer, a personal computer (PC), a desktop computer, a laptop computer, a notebook computer, a handheld computer, a tablet computer, or a wearable computing device such as a smart watch. In certain embodiments, payor device 202 may be configured with banking application 204 or other software enabling payor device 102 to interface with the financial institution server 210. In certain embodiments, payor device 202 may be a personal computing device running a web browser to access a website served by the financial institution server 210.

In certain embodiments, payor device 202 may be equipped with an image capture device 206, such as camera, for capturing a digitized image of the check. The image capturing device may also comprise, for example, a scanner connected to a personal computing device, or any other means known in the art for providing a digitized version of a document to a computing device.

In certain embodiments, banking application 204 may be an application specific to a certain financial institution, providing a range of banking functions to the payor. In other embodiments, banking application 204 may be a general application provided solely to interact with the check tampering prevention system 100. In yet other embodiments, banking application 204 may be a general web browser used to access a website served by financial institutions server 210.

Banking application 204 may be equipped with an image capturing capability, which utilizes image capture device 206 for capturing an image of a check. Such image capturing capabilities are well-known in current banking applications for providing the ability for mobile deposits of a check. Typically, the image capturing capability of banking application 204 will capture an image of both the front and the back of the check and upload those to the financial institution server 210 for deposit of the check into the customer's account. The customer may thereafter destroy the physical check after the deposit into the customer's account is confirmed. Banking application 204 may use the same image capturing capability and image capturing device to capture an image of the check for purposes of the check tampering prevention system 100. In certain embodiments, the image capturing facility captures images of both the front and the back of the check, while in other embodiments, only an image of the front of the check is captured.

Banking application 204 may have the capability to determine the quality of the capture of the image of the check and may request that a substitute image be captured if all required information on the check is not readable.

Banking application 204 may also collect certain metadata associated with the check. This may comprise, for example, the account number, the date, and the amount of the check and the payee. The payor may be queried to enter the metadata manually, or banking application 104 may be configured with a machine learning model which can determine the information automatically from the image of the check. In other embodiments, this information may be extracted from the check once the check has been sent to the financial institution server 210.

Once the metadata and a viable image of the check have been captured, banking application sends the image and the associated metadata, if any, from payor device 202 to the financial institution server 210, where it is received by check tampering prevention component 212.

Check tampering prevention component 212 receives the image of the check and the metadata. In some embodiments, check tampering prevention component 212 will verify the viability of the captured image of the check. In alternate embodiments, check tampering prevention component 212 may receive only an image of the check and may extract metadata from the image of the check using machine learning models. In other embodiments machine learning models may be used to extract information from the check not already included in the metadata but which may be added to the metadata received from banking application 204. For example, because banking account numbers are often long, it may be less error-prone to have check tampering prevention component 212 extract the account number automatically from the image of the check rather than having the payor enter the account number at the payor device 202. Further, because the vast majority of checks will have the account number already pre-printed thereon using a specific font, it may be easier for the check tampering prevention component 212 to extract the account number data from the check, rather than having the payor enter this data manually.

Once the check tampering prevention component 212 verifies that all information about the check is available, including a viable image of at least the front of the check, and the required metadata, a record 214 is formed containing the image and the metadata. Further, the metadata is forwarded to record hash calculation component 213 for calculation of the hash value 234 to be stored in record 214.

Figure 2B:
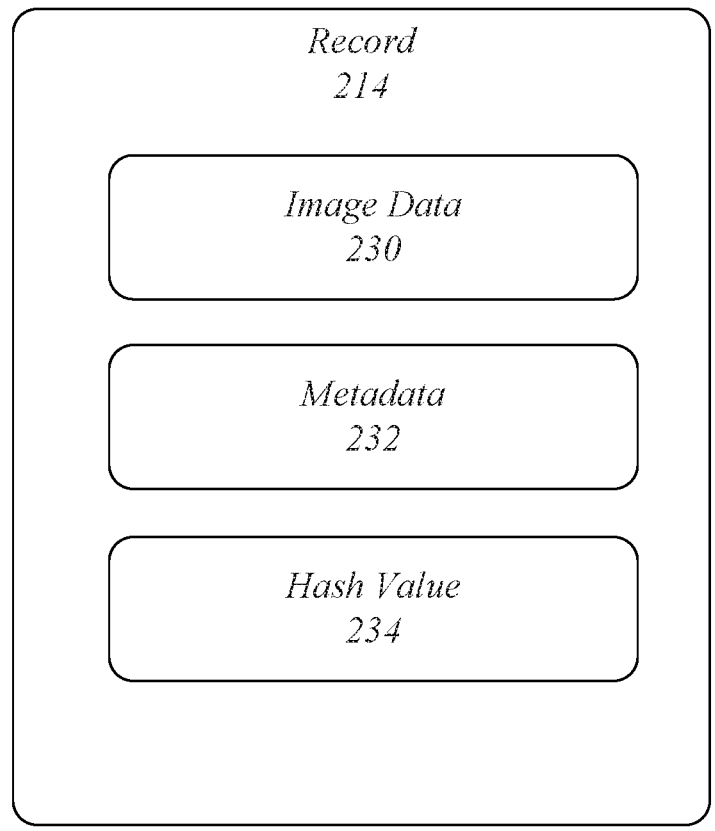
FIG. 2B as a block diagram showing the format and contents of a record used for recording the image of a single check in the blockchain.

FIG. 2B shows the contents of a record 214, which includes image data 230 comprising the digitized image of the check, metadata 232, and a hash value 234.

Record hash calculation component 213 may calculate a cryptographic hash value 234 using all or selected items of the metadata portion of the record and may store the hash value 234 in the record 214. Any well-known cryptographic hash function may be used, for example, Secure Hashing Algorithm 256 (SHA-256) which, given any input of any length, will create hash value 256 bits in length. Any other well-known hashing algorithm may also be used. In certain embodiments, the image of the check and the metadata may be encrypted using any well-known encryption algorithms prior to calculating the hash value 234.

The hash value 234 may be used as an index to retrieve the record 214 containing the image of the check from the blockchain 140. As such, it is necessary that the exact data be used to calculate the hash value 234 when attempting to retrieve the image as was used to calculate the hash value 234 which is included in the record 214. As such, it may be undesirable to include the digitized image of the check in the calculation of the hash value 234, because a captured image of the check taken at a later time may not match bit-for-bit with the original captured image of the check, resulting in a completely different hash value 234. This would render the record 214 containing the image of the check impossible to retrieve. In a preferred embodiment, the hash value 234 may be calculated using the account number, the date, and the amount of the check, although in other embodiments, any combination of the information contained in the metadata 232 may be used to calculate the hash value 234. Such as to be able to re-create the hash value 234 when attempting to retrieve the record containing the image of the check from the blockchain 140, it will be required to hash the metadata 232 in a certain order and format. For example, if the account number, the date, and the amount of the check are to be included in the calculation of hash value 234, a particular order of the metadata 232 and a particular format for the metadata 232 may be required. For example, the date may be required to be expressed in a M/D/Y format. The content and format of the data used for the calculation of the hash 234 value must be agreed upon by all participants in the blockchain 140.

Once the check tampering prevention component 212 has created the record 214, the record 214 may be stored in blockchain cache 216. Blockchain cache 216 may aggregate a number of records 214-1 . . . 214-n before releasing the records 214 for inclusion in blockchain 140. In various embodiments, records 214 may be held in blockchain cache 216 until a predetermined number of records 214 has been accumulated in blockchain cache 216, or based on other criteria, for example, time of day. In certain embodiments, it may be advantageous to accumulate records 214 for a given day and release them for inclusion in blockchain 140 during a less busy nighttime period. In alternative embodiments, record 214 may be released immediately for individual inclusion in the blockchain 140, bypassing blockchain cache 116.

Blockchain interface component 218 is responsible for moving records 214 from the financial institution server 210 to the blockchain 140. Because blockchain 140 exists in distributed form among many nodes, the main responsibility of blockchain interface component 218 is to publish records 214 to all participating member systems 110 in blockchain 140 for inclusion in the next data block to be added to blockchain 140, in a process which will be explained below. In certain embodiments, blockchain interface component 218 may receive confirmation when a data block 101 containing records 114 has successfully been included in blockchain 140 and may return that status to check tampering prevention component 212, which may report the status to banking application 204 on payor device 202.

Figure 3:
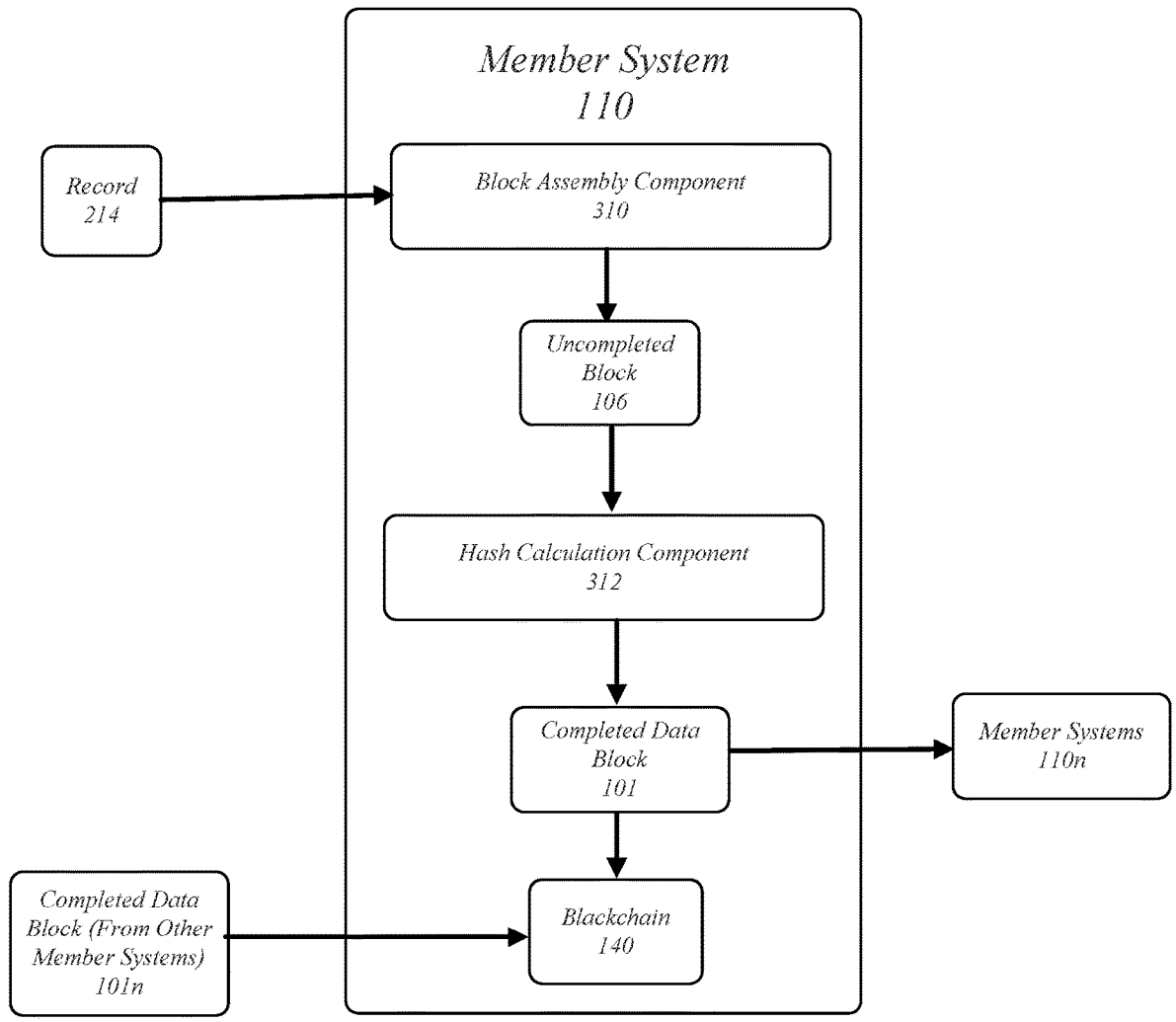
FIG. 3 as a logical diagram of components of a member system in accordance with various embodiments described herein

FIG. 3 the schematic diagram of components of a member system 110 in accordance with various embodiments described herein. Member systems 110 each have a copy of the current version of blockchain 140 and are authorized to complete blocks for inclusion in blockchain 140. In an embodiment utilizing a public blockchain, member systems 110 would be any system who wishes to participate in the blockchain. In a private or consortium blockchain, member systems would be organized in accordance with an agreement which sets forth the parameters of the blockchain including, for example, the format and size of the data payloads 107, the proof-of-stake function to be used to determine which member system 110 is able to complete which block, the format of headers 103, the hashing function to be used, etc.

Member system 110 receives a record 214 which is to be included in blockchain 140. Record 214 may be received, for example from one of user systems 114, who is authorized to participate in the blockchain 140 but is not authorized to complete blocks within blockchain 140, or from a member system 110 (including receiving the record from itself). When a node wishes to include a record 214 in blockchain 140 it is published to all member systems 110.

In an embodiment utilizing a proof-of-stake blockchain, each member system 110 will know which member system 110 is to complete the next data block 101 in the blockchain 140, based on solving the agreed-upon proof-of-stake function and will ignore record 214 when it is received, unless member system 110 is the member system designated to complete the block in accordance with the proof-of-stake function. In an embodiment utilizing a proof-of-work blockchain, each member system 110 will be competing to complete the block based on the satisfaction of the proof-of-work condition and, as such, each member system 110 will use record 214 in the assembly of uncompleted blocks 106.

Block assembly component 310 will collect records 214 until a block completion condition is met. The block completion condition may be, for example, a pre-determined number of records 214 have been received, or the lapsing of a pre-determined period of time since the last data block 101 was completed and added to blockchain 140. The block completion condition may be set forth in the agreement between the member systems 110.

In a proof-of-stake blockchain, when the block completion condition has been met, the block assembly component 310 of the member system 110 designated to complete the block will collect all received records 214 and assemble them into uncompleted block 106. In a proof-of-work blockchain, all member systems 110 participating in the blockchain 140 collect all received records 214 and assemble them into and uncompleted data block 106.

In a proof-of-stake blockchain, the hash calculation component 312 of the member system 110 designated to complete the data block 101 will calculate the hash value 105 of the data block 101 to generate completed data block 101. The completed data block 107 is then added to the local copy of the blockchain 140 at member system 110. Completed data block 101 is also published to all other member systems 110n for inclusion in their local copies of the blockchain 140. FIG. 3 shows member system 110 receiving a completed data block 101n from another member system that has completed the data block 101n. The hash value used in the proof-of-stake block chain may be as simple hash calculated using a well-known hashing algorithm or may be required to satisfy a proof-of-work condition, as with the proof-of-work blockchain.

In a proof-of-work blockchain, the hash calculation component 312 of all member systems 110 will attempt to complete the data block 101 by generating a nonce which will result in the calculation of a hash value 105 satisfying the proof-of-work condition. The first member system 110 to complete the data block 101 will send the completed data block 101 to all other member systems 110. When other member systems 110 receive completed data block 101n, they will verify that the proof-of-work condition has been satisfied and, if so, will add completed block data 101n to their local copy of blockchain 140.

Member system 110 may verify that one or more records 214 were included in a completed data block 101 that was successfully added to blockchain 140 by checking completed data blocks 101n received from other member systems or data blocks 107 completed by member system 110, both of which will be added to the local copy of blockchain 140 of member system 110, to determine that a completed data block 101 contains the one or more records 214.

Figure 4A:
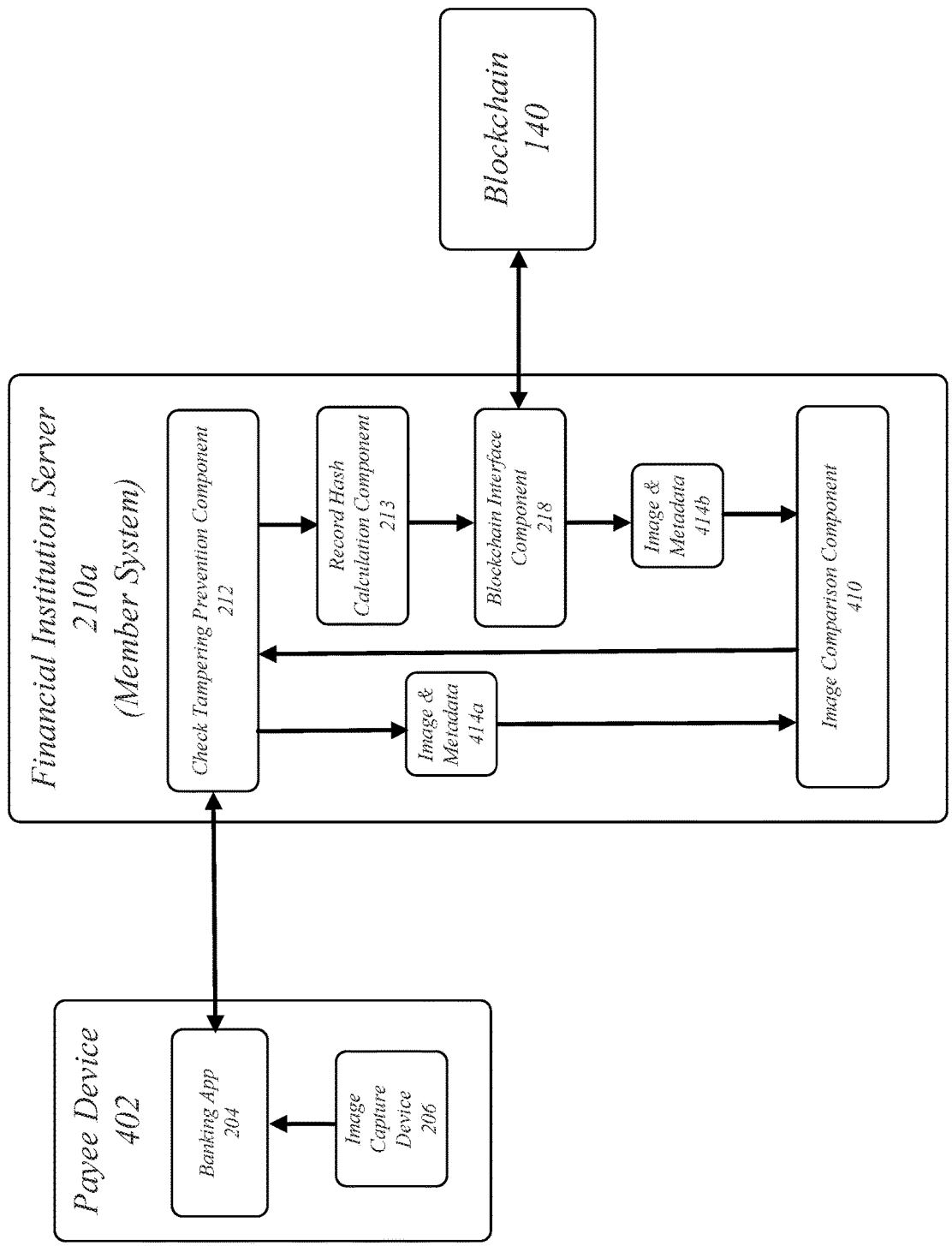
FIG. 4A is a logical diagram showing a member system acting as a financial institution server for retrieving a check image from the blockchain and comparing it to a check presented for redemption.

FIG. 4A illustrates a block diagram for a payee interacting with check tampering prevention system 100. In this embodiment, financial institution server 210a is a member system 110 in the blockchain 140, or a user system 114 having read access to the blockchain (i.e., having its own local copy of the blockchain 140).

It is assumed that the payee has received a physical check or the image of the physical check to be deposited in the payee's account. The payee may interact with a banking app 204 on payee device 402, as previously described, to deposit the check by capturing an image of the front and/or back of the check with the image capture device 206. In addition, as previously described with respect to the payor, metadata associated with the check is collected. The metadata may be entered manually by the payee or may be determined automatically using machine learning models operating on the captured image of the check and trained to retrieve metadata from handwritten or machine-produce checks. In preferred embodiments, it is desirable that the same metadata be collected at the payee device 402 as was collected at the payor device 202. Banking application 204 interacts with financial institution server 210a, in this case a member system 110 in blockchain 140, to send the image of the check and the metadata to check tampering prevention component 212.

In an alternate embodiment of the invention, the payee device 402 may be an automatic teller machine (ATM) which the payee uses to deposit the physical check. The ATM may have a version of the banking app 204 running thereon, and an image capture device 206 for collection of the image of the check and the metadata. In yet another embodiment, the payee may present the physical check for deposit at a brick-and-mortar location of a financial institution. Upon receipt of the physical check, the financial institution may scan the check to obtain the required image and may manually enter the required metadata or, alternatively, the metadata may be retrieved automatically utilizing machine learning models trained for retrieving metadata from handwritten or machine-produced checks. The image and metadata is then sent to check tampering prevention component 212.

In alternate embodiments, check tampering prevention component 212 may receive only an image of the check and will determine the required metadata using machine learning models.

Check tampering prevention component 212 forwards received image 414a to comparison component 410 to be used in the comparison with the image 414b retrieved from blockchain 140. Check tampering prevention component 212 forwards the metadata received from banking app 204, or retrieved by the check tampering prevention component 212 from the image of the check received in the banking app 204, to hash calculation component 312.

Record hash calculation component 213 is identical to the one described in reference to FIG. 2A and calculates a hash value using the same items of metadata 232 that were used to calculate hash value 234 stored in record 214. In a preferred embodiment of the invention, at least the account number upon which the check is drawn, the date, and the amount of the check is used in the calculation of the hash value however, in other embodiments, any combination of items of metadata may be used in the calculation. Further, it is necessary to use the same hash function, for example, SHA-256, as was used in the calculation of hash value 234.

The hash value calculated by record hash calculation component 213 is forwarded to blockchain interface component 218 to be used as an index to look up record 214 in its local copy of blockchain 140. Blockchain interface component 218 retrieves a copy of record 214 from blockchain 140, and extracts image data 230 therefrom, forming image 414b, which is forwarded to comparison component 410.

Comparison component 410 compares image 414a received from banking application 204 at payee device 402 and compares it with image 414b to determine a match. In certain embodiments comparison component 410 may also compare metadata associated with image 414a with metadata associated with image 414b. Comparison component 410 returns the results of the comparison of image and metadata 414a and image and metadata 414b, to check tampering prevention component 212, which may return the results to banking app 204 or send the results elsewhere. In some embodiments, the comparison between image 414a and image 414b may be performed by machine learning models trained to compare images of checks. In certain embodiments, if image or metadata 414a and image or metadata for 414b are found not to match, various alerts may be raised and delivered, indicating that a fraud has been attempted.

In an alternative embodiment of the invention, blockchain interface component 218 may forward image and metadata 414b to a printer for printing or to a display device for display and viewing by a human such that a manual comparison between the physical check presented by the payee and the image and metadata 414b may be made. In such an embodiment, the metadata required to calculate the hash value used by blockchain interface component 218 to retrieve record 214 from blockchain 140 will need be entered manually by a human operator. In yet another embodiment of the invention, check tampering prevention component 212 may forward image and metadata 414b retrieved from blockchain 140 to banking application 204 at payee device 402 for display on a display device (not shown) at payee device 402, such that the payee may make the comparison manually.

In certain embodiments, data blocks 101 may be removed from the blockchain 140 by a member system 110. The conditions for removal of a data block 101 from blockchain 140 should be set forth in the agreement between member systems 110 for management of the blockchain 140. In certain embodiments member system 110 may determine that a block 101 has been in blockchain 140 for a predetermined period of time. The predetermined period of time may be the time, for example, wherein all images of checks contained in the data block 101 are passed being able to be redeemed. Further, admit it may be necessary to determine that the data block 101 is the oldest data block in the blockchain 140. Because the data blocks 101 form a chain, it is not possible to remove a data block 101 from the middle of blockchain 140. Member systems 110 may check to see if any data block 101 in blockchain 140 meets the data block removal criteria when they have been designated to complete the next block in the blockchain 140. In such cases, member system 110 may remove data block one of its local copy of blockchain 140 and inform other member systems 110 to remove data block 11 from their local copies of blockchain 140. In an alternate embodiment, any member system may be able to perform the data block removal process independently on its local copy of the blockchain 140 by checking that the data block 101 be removed meets the data block removal criteria.

Figure 4B:
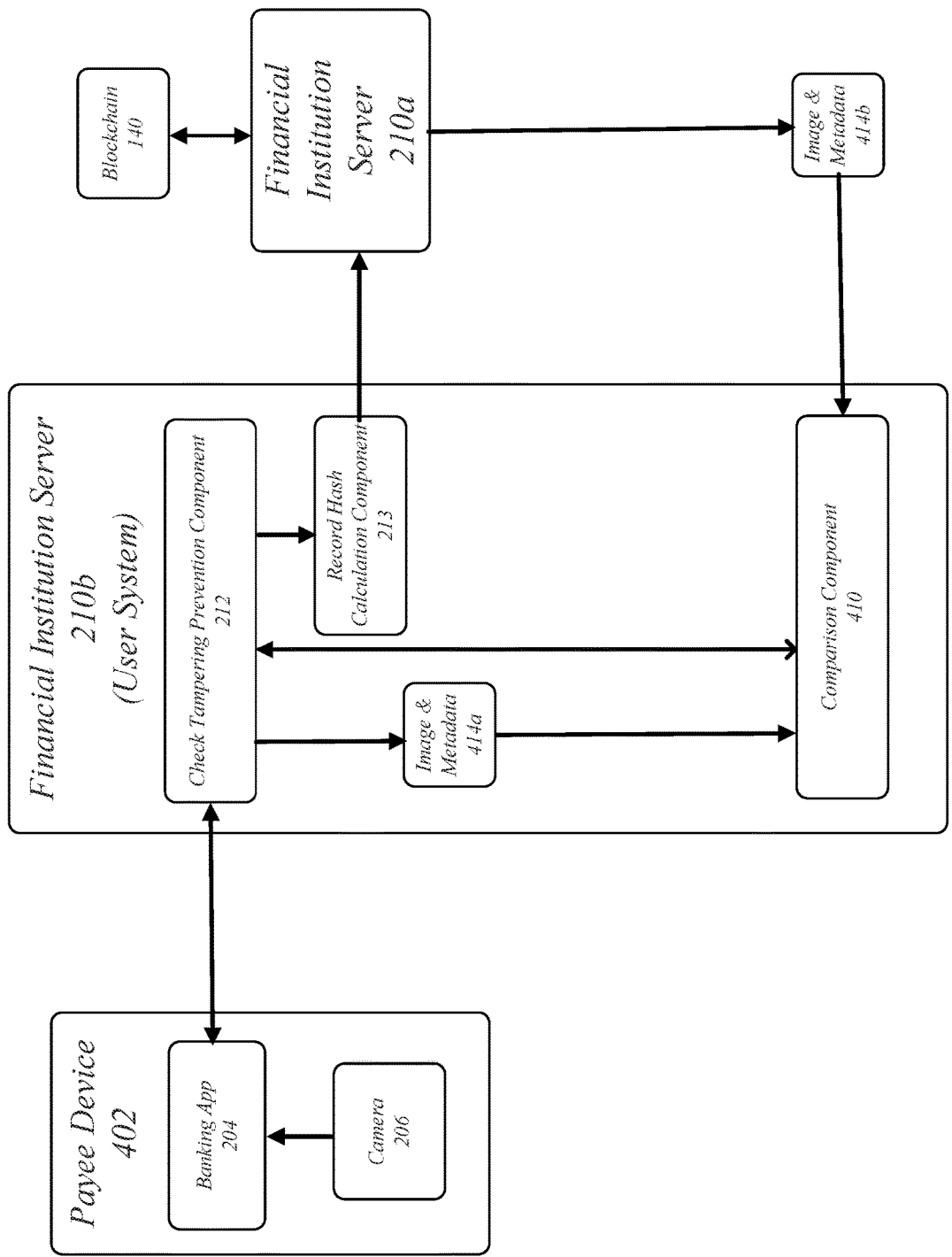
FIG. 4B is a logical diagram showing a user system acting as a financial institution server for retrieving a check image from the blockchain and comparing it to a check presented for redemption.

FIG. 4B shows an alternative embodiment of the invention in which financial institution server 210b is a user system 114 not having a local copy of blockchain 140 available from which to retrieve record 214 and in turn, image and metadata for 414b of the check. In such embodiments, financial institution server 210b operates identically to financial institution server 210a of FIG. 4A, with the exception that after the hash value has been calculated by record hash calculation component 213 it is forwarded to a financial institution server 210a, which is a member system 110 having a local copy of the blockchain available from which to retrieve record 214 containing image and metadata 414b. In this embodiment financial institution server 210a retrieves image and metadata 414b from its local copy of the blockchain 140 in the manner described above.

Although FIGS. 4A and 4B show a limited number of elements in a certain topology, it may be appreciated that more or fewer elements may be included in alternate topologies as desired for a given implementation.

FIG. 5 is a flowchart showing the process undertaken by the system shown in FIG. 2A for adding a record for a single check to the blockchain 140. At 502, the financial institution server 210 receives the check image data 230 and metadata 232 and creates a record 214 containing the check image 230 and metadata 232. At 504, the financial institution server 210 calculates the hash value 234 from one or more items of the metadata 232, and places hash value 234 in record 214. At 506, the record 214 is optionally cached in blockchain cache

216. In alternative embodiments, record 214 may immediately be published for inclusion in the blockchain 140. At 508, one or more records may be removed from blockchain cache 216 and optionally published to member systems for inclusion in blockchain 140. Step 508 is optional because financial institution server 210 may be the member system 110 designated by a proof-of-stake function to create the next data block 101 in blockchain 140, thereby removing the need to publish the one or more records to other member systems 110. In the event that financial institution server 210 is not the member system 110 designated to complete the next data block 207 in blockchain 140, the one or more records is published to all other member systems such that the member system 110 designated to create next data block 207 gains possession of the one or more records 214. In alternative embodiments, wherein the blockchain is based on proof-of-work rather than proof-of-stake, it will always be mess necessary to publish the one or more records 214 to all nodes in the distributed blockchain 140. At 510, confirmation is received that the data block 101 containing the one or more records 214 was added to the blockchain 140 and the status is returned to individual payors having a record 214 in the added data block 101. Confirmation is received when the financial institution server 210 receives a completed data block 101 containing the one or more records 214 and adds it to its local copy of the blockchain 140.

Figure 6:
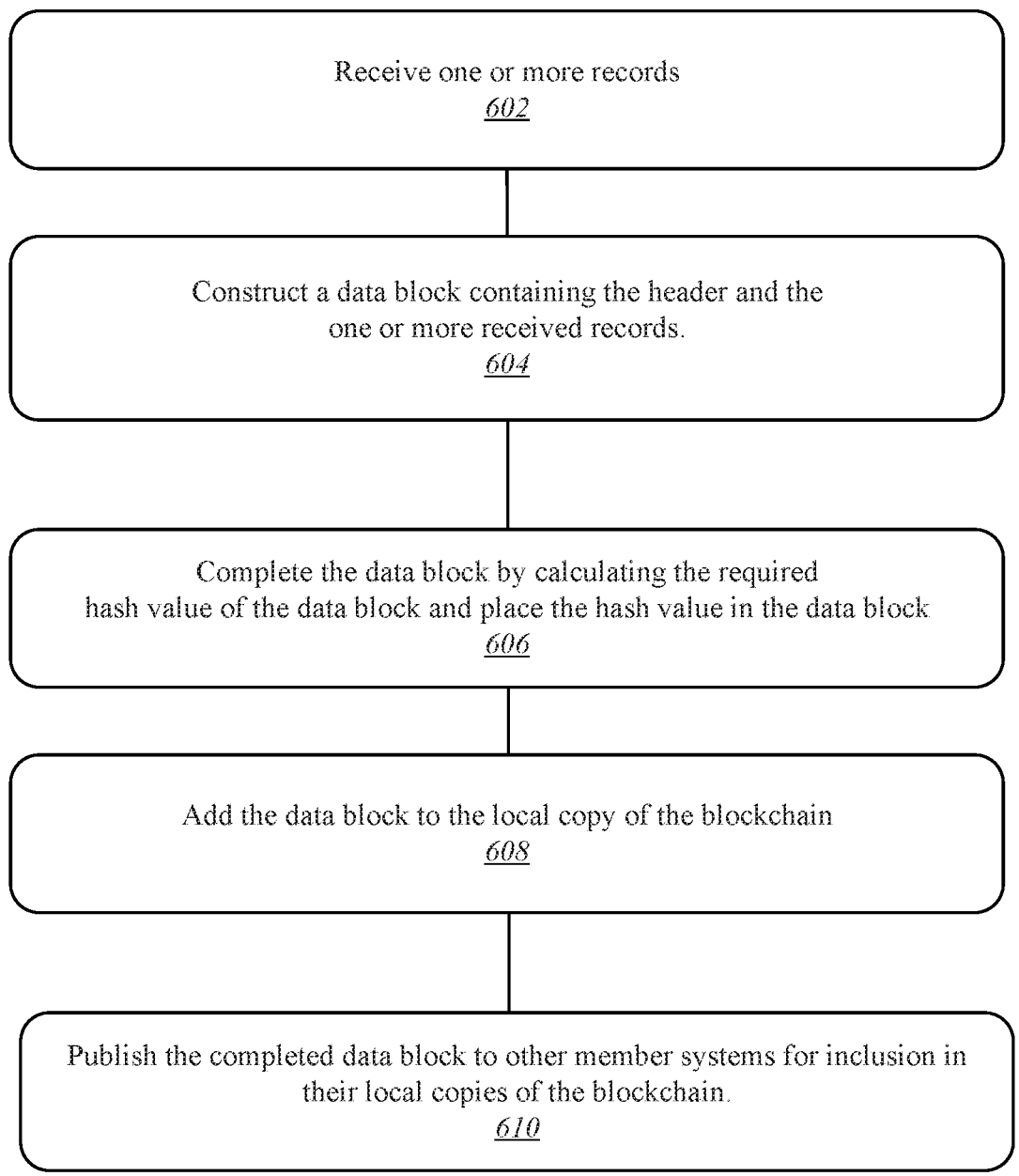
FIG. 6 is a flowchart showing a process for adding data blocks to the blockchain

FIG. 6 is a flowchart showing the process undertaken by a member system 110 shown in FIG. 3 for completing a data block 107 and adding it to blockchain 140. At 602, member system 110 receives the one or more records 214 and, at 604, a new data block 101 is constructed containing the header 103 and the one or more received records 214 as a data payload 107. To create the header 103, the hash value 105$n$–1 is retrieved from the last completed data block 101 in the local copy of the blockchain 140 and stored in the header 103 of the new data block 101, thereby linking the new data block 101 to blockchain 140. At 606, the new data block 101 is completed by calculating the required hash value 105 of data block 101 and placing the hash value 105 in the data block 101. As previously stated, the hash value 105 may be a simple hash of the contents of data block 101 or may be a hash value 105 conforming to a proof-of-work condition. At 608, the completed data block 101 is added to the local copy of the blockchain 140 and, at 610, the completed data block is published to other member systems 110 for inclusion in their local copies of the blockchain 140.

FIG. 7 is a flowchart showing the process undertaken to retrieve a record 214 from the blockchain 140 and compare it to a check presented by the payee by a financial institution server 210$a$ or 210$b$ shown in FIGS. 4A and 4B respectively. At 702, financial institution server 210 $a$ receives an image of the check to be verified and its associated metadata. At 704 a hash value is calculated using the received metadata, and at 706, the calculated hash value is used to retrieve record 214 from blockchain 140 using the hash value as an index. At 708, the record 214 is returned and image data 230 and metadata 232 are extracted from record 214. At 710, comparison is made between the extracted image 230 and metadata 232 with the image and metadata of the check to be verified, which was received at 702, and the results of the comparison are reported.

The scope of the invention is not meant to be limited by the specific implementations presented herein but is instead intended to be defined by the scope of the claims of the invention, a summary of which follows.

A system to implement the invention comprises, in one embodiment, one or more processors and memory containing instructions that when executed by the one or more processors causes the system to perform the functions of receiving one or more images of negotiable instruments, receiving metadata associated with each of the one or more negotiable instruments, creating a data block for storage in a blockchain, the data block comprising at least a header, a data payload storage and a hash value storage, the header storing at least a hash value from a previous block in the blockchain, and sending the data block to a node in the blockchain for completion.

The system may further comprise where in the blockchain is a consortium blockchain and wherein the system as a node in the blockchain wherein the instructions cause a system to perform the further functions of receiving the data block, determining that the system has the right to complete the data block based on a deterministic formula that is a function of a proof of stake in the blockchain, calculating a cryptographic hash of the contents of the data block, storing the hash value in the data block and sending the completed data block to all nodes in the blockchain.

The system may further alternatively comprise wherein the blockchain is a public blockchain and further wherein the system as a node in the blockchain, wherein the instructions cause a system to perform the further functions of receiving the data block, encrypted and the data block, performing a proof of work calculation to determine a cryptographic hash of the contents of the data block the cryptographic hash meeting certain criteria, completing the data block by storing the hash value in the hash value storage of the data block and sending the completed data block to all nodes in the blockchain. In this embodiment, performing the proof of work calculation comprises calculating a nonce value for inclusion in the data block that will result in the calculation of a cryptographic hash meeting the criteria.

The system may further alternatively comprise a private blockchain wherein the system as a node in the blockchain, wherein the instructions cause a system to perform the further functions of receiving the data block, calculating the cryptographic hash of the contents of the data, completing the data block by storing the cryptographic cash in the hash value storage of the data block and sending the completed data block to all nodes in the blockchain.

The system may further comprise instructions that cause a system to perform the further functions of determining that a block in the blockchain has been in the blockchain for a predetermined period of time, determining that the data block is the oldest data block in the blockchain and removing the block from the blockchain.

The system may be used where in the negotiable instrument is a handwritten check and further wherein the metadata comprises a digital fingerprint of the recognized handwriting.

The system may be used wherein the negotiable instrument is a check and wherein the metadata from which the hash of the record comprises at least the account number in which a check is drawn, the date and the amount of the check.

The system may further comprise wherein, for each image, a hash value comprising the cryptographic cash of the metadata associated with the image is created and included along with the image and the metadata in the data block.

A method implementing the invention comprises, in one embodiment, the steps of receiving one or more images of negotiable instruments from one or more client devices, determining metadata associated with the one or more images, creating a record for each of the one or more images and storing each image and its associated metadata in the record, caching the records into a predetermined number of records is in the cash or until predetermined amount of time has elapsed and sending the records to a node in the blockchain.

The method may further comprise wherein the negotiable instrument is a check and wherein the metadata comprises at least the account number on which is check is drawn, the date and the amount of the check or wherein the check is a handwritten check and where in the metadata is extracted by performing handwriting recognition on the image of the check.

The method may further comprise performing optical character recognition on the image of the check or analyzing the image of the check with a machine learning model to determine the account number, the date and the amount of the check.

The method may further comprise wherein determining the metadata associated with the received image comprises receiving the metadata with the image directly from a client device.

In another embodiment of the invention, the method may comprise the steps of receiving a scanned image of a negotiable instrument, determining metadata associated with the negotiable instrument, calculating a hash of the metadata associated with the negotiable instrument, sending a request to a node in a blockchain for retrieval of a record containing an image and metadata from the blockchain, the record being indexed in the blockchain by the hash of the metadata, retrieving the record from the blockchain and extracting the image and metadata from the record and determining that the negotiable instrument has not been altered by comparing the scanned image of the negotiable instrument with the image extracted from the record.

In another embodiment, the method may comprise wherein the scanned image is compared to the image extracted from the record by a trained machine learning model.

In another embodiment, the method may further comprise the step of comparing the determined metadata to the metadata extracted from the record.

In another embodiment the method may comprise wherein the negotiable instrument is a check and further wherein the determined metadata includes at least the account number on which a check is drawn, the date and the amount of the check. The method may further comprise the step, wherein the check is a handwritten check, of performing handwriting recognition on the scanned image of the check to determine the metadata, wherein the handwriting recognition is performed using a trained machine learning model.

In another embodiment, the method may further comprise the step of performing optical character directing recognition on the scanned image of the check to determine the metadata.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art and it is understood that it is not intended to limit the scope of the invention.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as calculating or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise one or more general-purpose computers as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition. in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively.

What has been described above includes examples of the disclosed arrangement of components. It is, of course, not possible to describe every conceivable combination of components and/or methodologies, but one of ordinary skill in the art may recognize that many further combinations and permutations are possible in various implementations of the invention. Accordingly, the novel arrangement of components is intended to embrace all such alterations, modifications, and variations that fall within the spirit and scope of the appended claims.

We claim:

1. A system comprising:
one or more processors;
memory containing instructions that, when executed by the one or more processors, causes the one or more processors to perform operations of:
receiving a first digital image of a negotiable instrument;
extracting first metadata from the first digital image of the negotiable instrument using an optical character recognition technique, the first metadata comprising a first instance of an account number, a date, and an amount;
calculating a first hash value using the first metadata extracted from the first digital image of the negotiable instrument with the first instance of the account number, the date, and the amount;
creating a record for a blockchain, the record comprising at least a header, a data payload, and the first hash value, wherein the header includes at least a second hash value from a previous block in the blockchain, the data payload including the first digital image and the metadata of the negotiable instrument, and the first hash value is used as an index to retrieve the record;
storing the first digital image and the first metadata associated with the negotiable instrument in the data payload;
publishing the record as a data block in the blockchain, wherein the data block is indexed in the blockchain with the first hash value;
receiving a second digital image of the negotiable instrument;
extracting second metadata from the second digital image of the negotiable instrument using the optical character recognition technique, the second metadata comprising a second instance of the account number, the date, and the amount;
calculating a third hash value using the second metadata extracted from the second digital image of the negotiable instrument with the second instance of the account number, the date, and the amount;
retrieving the record from the blockchain using the first hash value as the index in response to the third hash value matching to the first hash value;
retrieving the first digital image and the first metadata from the record;
comparing the first digital image and the second digital image;
determining either: the negotiable instrument has not been altered based on the first digital image matching the second digital image; or
the negotiable instrument has been altered based on the first digital image not matching the second digital image.

2. The system of claim 1 wherein the blockchain is a public blockchain and further wherein the system is a node in the blockchain, the instructions causing the system to perform the operations of:
receiving the data block;
encrypting the data block;
performing a proof-of-work calculation to determine a cryptographic hash of contents of the data block, the cryptographic hash meeting certain criteria;
completing the data block by storing the cryptographic hash in a hash value storage of the data block; and
sending the completed data block to all nodes in the blockchain;
wherein performing the proof-of-work calculation comprises calculating a nonce value for inclusion in the data block that will result in a calculation of the cryptographic hash meeting the criteria.

3. The system of claim 1 wherein the blockchain is a private blockchain and further wherein the system is a node in the blockchain, the instructions causing the system to perform the operations of:
receiving the data block;
calculating cryptographic hash of contents of the data block;
completing the data block by storing the cryptographic hash in the hash value storage of the data block; and
sending the completed data block to all nodes in the blockchain.

4. The system of claim 1, the instructions causing the system to perform the operations of:
determining that a block in the blockchain has been in the blockchain for a predetermined period of time;
determining that the block is an oldest block in the blockchain; and
removing the block from the blockchain.

5. The system of claim 1 wherein the negotiable instrument is a check and wherein the account number is an account number on which the check is drawn and the amount is an amount of the check.

6. The system of claim 1, the instructions to cause the one or more processors to perform the operations of:
for the first digital image, creating the first hash value comprising a cryptographic hash of the first metadata; and
storing the hash of the first metadata with the first digital image and the first metadata in the data block.

7. A computer-implemented method, comprising:
receiving a first digital image of a negotiable instrument;
extracting first metadata from first digital image of the negotiable instrument using an optical character recognition technique, the first metadata comprising a first instance of an account, a date, and an amount;
calculating a first hash value for the first digital image of the negotiable instrument with the first instance of the account number, the date, and the amount;
creating a record for a blockchain, the record comprising at least a header, a data payload, and the first hash value, wherein the header includes at least a second hash value from a previous block in the blockchain, the data payload including first digital image and the metadata of the negotiable instrument, and the first hash value is used as an index to retrieve the record;
storing the first digital image and the first metadata associated with the negotiable instrument in the data payload;
publishing the record as a data block in the blockchain, wherein the data block is indexed in the blockchain with the first hash value;
receiving a second digital image of the negotiable instrument;
extracting second metadata from the second digital image of the negotiable instrument using the optical character recognition technique, the second metadata comprising a second instance of the account number, the date, and the amount;
calculating a third hash value using the second metadata extracted from the second digital image of the negotiable instrument with the second instance of the account number, the date, and the amount;

retrieving the record from the blockchain in response to the third hash value matching to the first hash value;

retrieving the first digital image and the first metadata from the record;

comparing the first digital image and the second digital image;

determining either: the negotiable instrument has not been altered based on the first digital image matching the second digital image; or determining the negotiable instrument has been altered based on the first digital image not matching the second digital image.

8. The computer-implemented method of claim 7, wherein the blockchain is a public blockchain, and the method comprising:

receiving the data block;

encrypting the data block;

performing a proof-of-work calculation to determine a cryptographic hash of contents of the data block, the cryptographic hash meeting certain criteria;

completing the data block by storing the cryptographic hash in a hash value storage of the data block; and sending the completed data block to all nodes in the blockchain;

wherein performing the proof-of-work calculation comprises calculating a nonce value for inclusion in the data block that will result in a calculation of a cryptographic hash meeting the certain criteria.

9. The computer-implemented method of claim 7, wherein the blockchain is a private blockchain, and the method comprising:

receiving the data block;

calculating cryptographic hash of contents of the data block;

completing the data block by storing the cryptographic hash in the hash value storage of the data block; and sending the completed data block to all nodes in the blockchain.

10. The computer-implemented method of claim 7, comprising:

determining that a block in the blockchain has been in the blockchain for a predetermined period of time;

determining that the block is an oldest block in the blockchain; and removing the block from the blockchain.

11. The computer-implemented method of claim 7, wherein the negotiable instrument is a check and wherein the first metadata includes at least an account number on which the check is drawn, a date and an amount of the check.

12. The computer-implemented method of claim 7, comprising:

for the first digital image, creating the first hash value comprising a cryptographic hash of the first metadata associated with the first digital image; and storing the hash of the first metadata with the first digital image and the first metadata associated with the first digital image in the data block.

13. The system of claim 1, wherein using the optical character recognition techniques includes applying a handwriting recognition model.

14. The computer-implemented method of claim 7, wherein using the optical character recognition technique includes applying a handwriting recognition model.

15. The system of claim 1, further comprising:

consolidating several checks received from different payors and include each image and associated metadata of each of the several checks in a record as part of the data payload of a data block within the blockchain.

16. The system of claim 15, wherein:

the data payload includes one or more records containing one or more images of other negotiable instruments and the metadata related to the other negotiable instruments.

17. The computer-implemented method of claim 7, further comprising:

consolidating several checks received from different payors and include each image and associated metadata of each of the several checks in a record as part of the data payload of a data block within the blockchain.

18. The computer-implemented method of claim 17, wherein:

the data payload includes one or more records containing one or more images of other negotiable instruments and the metadata related to the other negotiable instruments.

* * * * *